US007391598B2

(12) United States Patent
Fujiwara et al.

(10) Patent No.: US 7,391,598 B2
(45) Date of Patent: Jun. 24, 2008

(54) IONIZER

(75) Inventors: Nobuhiro Fujiwara, Tsukuba-gun (JP); Shigeru Komoriya, Tsukuba-gun (JP); Noriaki Kusaba, Tsukuba-gun (JP); Satoshi Suzuki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 224 days.

(21) Appl. No.: 11/288,110

(22) Filed: Nov. 29, 2005

(65) Prior Publication Data

US 2006/0114636 A1 Jun. 1, 2006

(30) Foreign Application Priority Data

Nov. 30, 2004 (JP) ............................ 2004-346988

(51) Int. Cl.
*H02H 1/00* (2006.01)
*H02H 3/22* (2006.01)

(52) U.S. Cl. ...................................................... 361/212

(58) Field of Classification Search ................ 361/212, 361/230
See application file for complete search history.

(56) References Cited

U.S. PATENT DOCUMENTS 7,031,133 B2 * 4/2006 Riebel et al. ............... 361/212

FOREIGN PATENT DOCUMENTS

JP 2002-260821 9/2002

* cited by examiner

*Primary Examiner*—Ronald W Leja
(74) *Attorney, Agent, or Firm*—Oblon, Spivak, McClelland, Maier & Neustadt, P.C.

(57) ABSTRACT

To provide an ionizer wherein an air flow path in a hollow casing is formed so as to be pressure-resistant while ensuring an effective cross sectional area without becoming voluminous, and the flow path is ensured simply and easily. In an ionizer including a hollow casing that contains a high voltage power unit and a control unit inside, along the longitudinal direction of the casing, a plurality of electrode units each including needle electrodes and an air outlet for blowing out an air stream around the needle electrodes are arranged in a line. A part along the longitudinal direction of the hollow casing is formed of a synthetic resin, and a resin casing composed of the synthetic resin is integrally formed with a conduit of an air flow path extending in the longitudinal direction of the casing so that a part of the inner wall of the resin casing serves as a wall of the conduit and that the air flow path communicates with the air outlet.

6 Claims, 2 Drawing Sheets

IONIZER

TECHNICAL FIELD

The present invention relates to an ionizer for removing electric charges from various charged objects, for example, semiconductor-related objects requiring electricity removal, charged with positive or negative electric charges.

BACKGROUND ART

Conventionally, as means for decreasing the amount of electric charges in objects requiring electricity removal close to zero, there has been known an ionizer wherein high direct current or alternating current voltage from a high voltage generating unit is applied to a needle electrode and corona discharge is generated, and positive or negative ions are output by the needle electrode, and these ions are blown on charged objects with an air stream.

Further, for convenience in using the ionizer, there has also been known an ionizer structure wherein a hollow casing to contain a high voltage power unit and a control unit therein is arranged, and along the longitudinal direction of the casing, a plurality of electrode units each having a needle electrode for generating corona discharge are arranged in a line. (For example, refer to Japanese Unexamined Patent Application Publication No. 2002-260821).

In the case when an ionizer is structured as one contained in such a hollow casing as above, because it is necessary to make air flow around the needle electrode and thereby make generated ions flow in the direction of charged objects, an air flow path from a supply source for generating the air flow is opened around the needle electrode, and for this purpose, as shown in the Patent JP 2002-260821, it is usual to form the air flow path by joining upper and lower flat plate shaped flow route forming members that are joined with each other, wherein the portion for supporting the needle electrode in the air flow path is formed as a sleeve or the like.

However, in this case, the air flow path is formed by joining the upper and lower plate shaped flow route forming members whose areas are relatively large, and so, the force applied onto the corresponding flow route forming members becomes extremely large owing to air pressure that is supplied to the inside, therefore, the members cannot endure the inside air pressure unless their joining strength is increased sufficiently, and as a consequence, there are conditions that the flow route forming members must be formed large enough to have high strength, or the air pressure to be supplied must be lowered.

Further, because the flow route forming members are made separately from the hollow casing, they must be connected to the outside via a part of the hollow casing, and so for this reason, complicated assembly work such as connections with tubes or the like are required.

DISCLOSURE OF THE INVENTION

It is an object of the present invention to provide an ionizer wherein an air flow path in a hollow casing is made so as to be pressure-resistant while ensuring an effective cross sectional area without becoming voluminous, and the flow path is ensured simply and easily.

An ionizer of the present invention for solving the above problems includes a hollow casing containing a high voltage power unit and a control unit inside; and a plurality of electrode units each including needle electrodes for generating corona discharge, and an air outlet for blowing an air stream around the needle electrodes, the plurality of electrode units being arranged in a line along the longitudinal direction of the casing, wherein the whole or a part along the longitudinal direction of the hollow casing is formed of a synthetic resin, a resin casing composed of the synthetic resin is integrally formed with a conduit of an air flow path extending in the longitudinal direction of the casing so that a part of the inner wall of the resin casing serves as a wall of the conduit, and the air flow path communicates with the air outlet.

In a preferred embodiment of an ionizer according to the present invention, to a casing base that holds the high voltage power unit and the control unit, a resin casing integrally formed with the conduit of the air flow path is attached to cover these units, and in this case, the air flow path in the resin casing may be integrally formed so as to be flat along the external wall surface, thereby it is possible to make the space inside of the casing wide while ensuring a large cross sectional area of the air flow path.

Further, in another preferred embodiment of an ionizer according to the present invention, the casing base that holds the high voltage power unit and the control unit is formed of a casing composed of a synthetic resin, and a protective cover is attached to the high voltage power unit and the control unit, and the conduit of the air flow path is integrally formed with the base.

In the above preferred embodiments according to the present invention, in an end plate that closes the end portion of the resin casing, an air supply port that directly communicates with the air flow path in the resin casing may be opened.

In still another preferred embodiment of an ionizer according to the present invention, the electrode units have a pair of first and second needle electrodes that are arranged to oppose each other and to which positive and negative high voltages are applied individually, and the control unit is structured to perform the control to switch between one electrified condition to apply positive high voltage to the first needle electrode and connect the second needle electrode to ground at the same time, and the other electrified condition to connect the first needle electrode to ground and apply negative high voltage to the second needle electrode at the same time.

The ionizer having the above structure according to the present invention is an ionizer including a plurality of electrode units each including needle electrodes for generating corona discharge, and an air outlet for blowing an air stream around the needle electrodes, the electrode units being arranged in a line along the longitudinal direction of the hollow casing, wherein the whole or a part along the longitudinal direction of the hollow casing is formed of a synthetic resin, and a resin casing composed of the synthetic resin is integrally formed with a conduit of an air flow path extending in the longitudinal direction of the casing so that a part of the inner wall of the resin casing serves as a wall of the conduit and that the air flow path communicates with the air outlet. Therefore, it is possible to form the air flow path forming members into ones having extremely excellent pressure resistance, in comparison with the case of forming the air flow path forming members by joining a pair of plate shaped flow route forming members.

Moreover, by opening the air supply port that directly communicates with the air flow path in the resin casing in the end plate that closes the end portion of the resin casing, the air flow path may be connected to the supply source of compressed air and therefore, it is possible to simplify the structure of a compressed air supply system.

According to the ionizer of the present invention described in detail above, it is possible to make the air flow path in the hollow casing pressure-resistant while ensuring an effective cross sectional area without becoming voluminous, and ensure the flow path simply and easily.

BEST MODE FOR CARRYING OUT THE INVENTION

Figure 1:
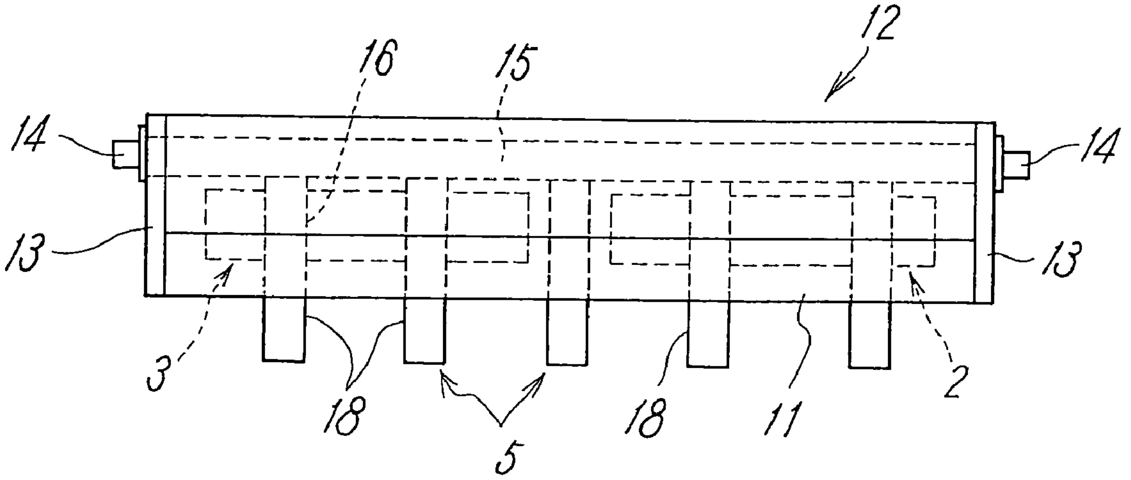
FIG. 1 is a schematic structural view of a first embodiment of an ionizer according to the present invention.
Figure 2:
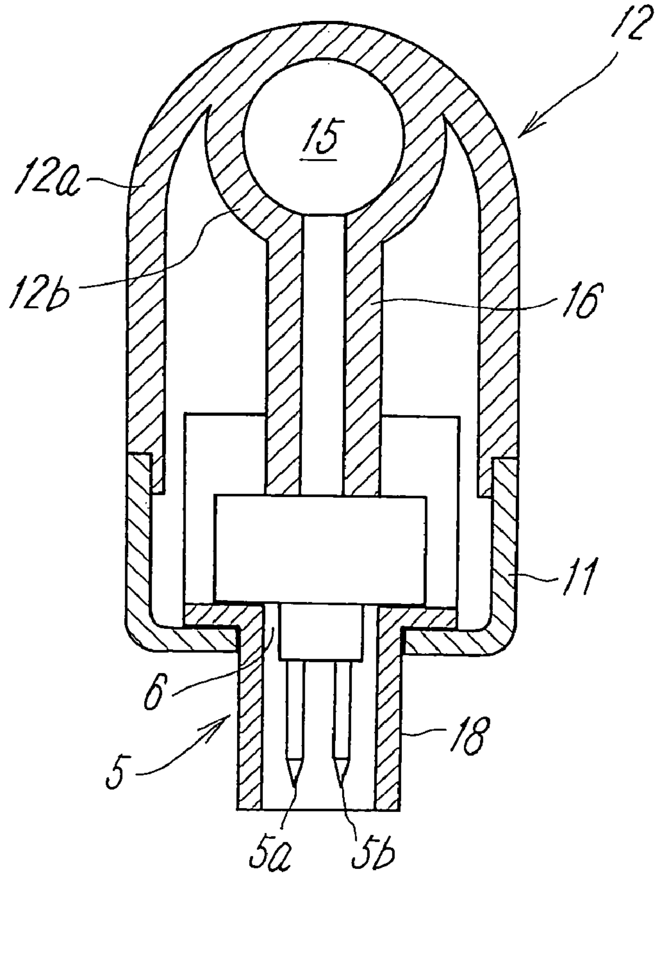
FIG. 2 is an enlarged view of the principal part of the first embodiment.

FIG. 1 shows the entire structure of a first embodiment of an ionizer according to the present invention, and the cross sectional view of the substantial part thereof is shown in FIG. 2.

This ionizer is to be used by being arranged to oppose objects requiring electricity removal and the like that are transferred along a conveyor line, and a high voltage power unit 2 and a control unit 3 are contained in a long horizontally mounted hollow casing 1, and in one side (under side) of the casing 1, along the longitudinal direction of the casing, a plurality of electrode units 4 each having needle electrodes 5*a*, 5*b* for generating corona discharge and an air outlet 6 for blowing an air stream around the needle electrodes are arranged in line.

In an ionizer according to the present invention, the whole or a part along the longitudinal direction of the hollow casing 1 may be formed of a synthetic resin. However, in this first preferred embodiment, to a casing base 11 for holding the high voltage power unit 2 and the control unit 3, a resin casing 12 formed so as to cover the units 2, 3 is attached, thereby completing the hollow casing 1. The base 11 may be composed of a synthetic resin or other material.

In the resin casing 12, a cover portion 12*a* for covering the high voltage power unit 2 and the control unit 3, and a conduit 12*b* for forming an air flow path 15 extending in the longitudinal direction of the casing 1 with a part of the inside wall thereof serving as a conduit wall are integrally formed of a synthetic resin, and both the foot portions of the cover portion 12*a* may be fixed to the side edges of the casing base 11.

Further, the resin casing 12 has end plates 13 for closing the end portions thereof, and these end plates 13 seal at least the air flow path 15 airtight in the resin casing 12 by inserting a sealing member around it and contact to the resin casing 12, and an air supply port 14 that directly communicates with the air flow path 15 is opened in the end plates 13.

In the conduit 12*b* in the resin casing 12, a plurality of branch tubes 16 for branching the air flow path 15 to communicate with each electrode unit 4 are arranged in correspondence to the arrangement interval of the electrode units 4. The branch tubes 16 are illustrated as being integrally formed with the conduit 12*b*, but they may be formed separately from the conduit 12*b* and be fixed to the external surface of the conduit 12*b* by means of adhesion or so, thereby it is possible to simplify the shape of the resin casing 12 and make the formation thereof easy.

Further, the branch tubes 16 are connected, via flow paths going through the high voltage power unit 2 or the control unit 3, or flow paths avoiding the units 2, 3, not illustrated, to the air outlet 6 for blowing an air stream around the needle electrodes 5*a*, 5*b* in each electrode unit 4. By arranging such an air outlet 6, it is possible to send ions generated between the pair of needle electrodes 5*a*, 5*b* to the vicinity of objects requiring electricity removal with an air stream, and remove electricity efficiently.

The electrode unit 4 is the unit wherein a plurality of holding cylinders 18 made of insulating material and going through the casing base 11 are protruded in a line from the under surface, and in the holding cylinder 18, a pair of first and second needle electrodes 5*a*, 5*b* to which positive and negative high voltages are individually applied are arranged to oppose each other, and positive or negative high voltage for corona discharge generated by the high voltage power unit 2 is applied to the needle electrodes 5*a*, 5*b* by the control of the control unit 3 described later herein.

The high voltage power unit 2, in order to apply high voltage for corona discharge to the needle electrodes 5*a*, 5*b*, has members for generating the high voltage, and, the control unit 3 controls the entire actions of the ionizer, displays action conditions, and further performs the control to switch the voltage application to the needle electrodes between one power distribution to apply positive high voltage to the first needle electrode 5*a*, and connect the second needle electrode 5*b* to ground at the same time, and the other power distribution to connect the first needle electrode 5*a* to ground, and apply negative high voltage to the second needle electrode 5*b* at the same time.

When the pair of needle electrodes 5*a*, 5*b* are arranged to oppose each other, and high voltage is applied to one needle electrode, and the other needle electrode is connected to ground as described above, it is possible to make it unnecessary to arrange a grounded grounding plate that is used in an ordinary ionizer, and generate positive and negative ions efficiently, and remove electric charges.

Also, the electrode unit 4 is not limited to the above mentioned one wherein the first and second needle electrodes 5*a*, 5*b* are arranged to oppose each other, but known various needle electrodes may be employed, and in this case, the power distribution control of the control unit to the needle electrodes is different from the above one naturally, and it is necessary to take a control mode suitable for the needle electrodes to be employed.

The ionizer having the above structure is an ionizer including a plurality of electrode units 4 each including needle electrodes 5*a*, 5*b* for generating corona discharge, and an air outlet 6 for blowing an air stream around the needle electrodes arranged in a line along the longitudinal direction of the hollow casing 1, and in the resin casing 12 extending in the longitudinal direction of the hollow casing 1, the conduit 12*b* of air flow path 15 extending in the longitudinal direction of the resin casing 12 with a part of the inside wall thereof serving as a conduit wall is formed integrally, and so, it is possible to form the air flow path forming members into ones having extremely high strength, in comparison with the case of forming the air flow path forming members by joining a pair of plate shaped flow route forming members.

Moreover, by opening the air supply port 14 that directly communicates with the air flow path in the resin casing 12, in the end plates 13 that close the end portions of the resin casing 12, the air flow path may be connected to the supply source of compressed air, therefore it is possible to simplify the structure of a compressed air supply system.

Also, the end plates 13 are to close the end portion of a thin air flow path in the resin casing 12, and the area thereof to which air pressure in the air flow path works is extremely small. Accordingly, the end plates are not subject to a large force by air pressure even if it is joined to the resin casing 12.

Figure 3:
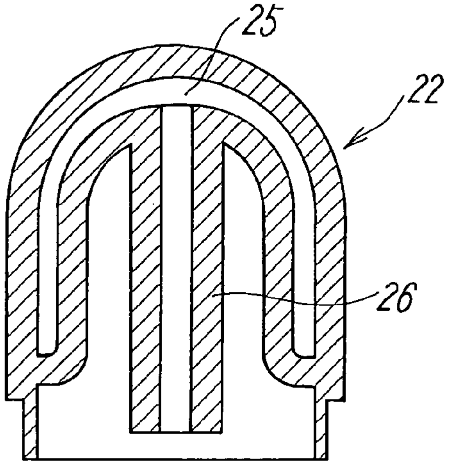
FIG. 3 is an enlarged cross sectional view of a resin casing in a second embodiment of the ionizer according to the present invention.
Figure 4:
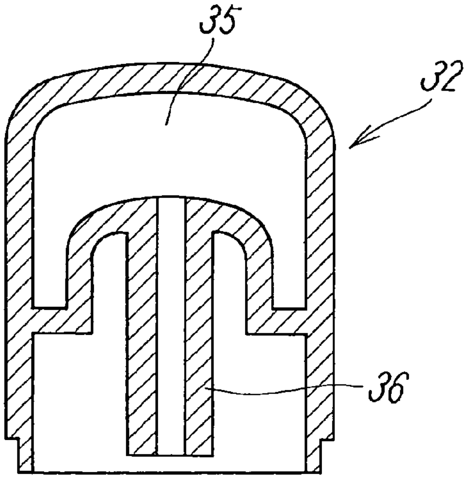
FIG. 4 is an enlarged cross sectional view of a resin casing in a third embodiment.

FIG. 3 and FIG. 4 show cross sectional views of only resin cases in second and third embodiments of an ionizer according to the present invention.

In the second embodiment in FIG. 3, in the same manner as in the first embodiment, an air flow path 25 in a resin casing 22 made of a synthetic resin and forming a hollow casing 1 is integrally formed to be flat along the external wall surface, thereby it is possible to make the space in the hollow casing 1 while making the cross sectional area of the air flow path 25 large. Meanwhile, reference numeral 26 in the figure denotes a branch tube.

Further, in the third embodiment shown in FIG. 4, priority is put on enlarging the cross sectional area of an air flow path 35 in a similar resin casing 32, which is advantageous to the case where the number of branch tubes 36 is increased.

Meanwhile, other structures and operations in the second and third embodiments are not different from those in the first embodiment, therefore, illustrations and explanations thereof are omitted.

Figure 5:
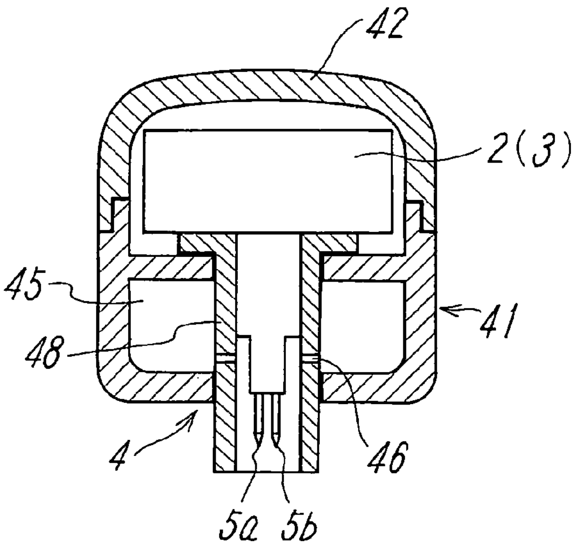
FIG. 5 is an enlarged view of the principal part of a fourth embodiment of the ionizer according to the present invention.

Furthermore, FIG. 5 shows a fourth embodiment of an ionizer according to the present invention, wherein a casing base 41 that holds the high voltage power unit 2 and the control unit 3 is formed of a casing composed of a synthetic resin, and a protective cover 42 is attached to the high voltage power unit 2 and the control unit 3, and in the base 41, a conduit forming an air flow path 45 with a part of the inside wall thereof serving as a conduit wall is integrally formed, and the air flow path 45 is connected to an air outlet 46 that blows an air stream to needle electrodes 5*a*, 5*b* in the electrode unit 4.

The electrode unit 4 is the unit wherein a plurality of holding cylinders 48 made of insulating material and going through the air flow path 45 in the casing base 41 are protruded in a line from the under surface of the casing base 41, and in the holding cylinder 48, the pair of first and second needle electrodes 5*a*, 5*b* are arranged to oppose each other, and an air outlet 46 that blows an air stream from the air flow path 45 around the needle electrodes 5*a*, 5*b* are opened in the holding cylinder 48.

Meanwhile, other structures and operations in the fourth embodiment are not different from those in the first embodiment.

The invention claimed is:

1. An ionizer comprising:

a hollow casing containing a high voltage power unit and a control unit inside; and a plurality of electrode units each including needle electrodes for generating corona discharge, and an air outlet for blowing an air stream around the needle electrodes, the plurality of electrode units being arranged in a line along the longitudinal direction of the casing, wherein the hollow casing comprises a lower casing portion and an upper casing portion, the lower casing portion holding the high voltage power unit, the control unit, and the electrode unit, and the upper casing portion mounted on an upper portion of the lower casing portion and covering the high voltage power unit and the control unit, and at least one of the upper casing portion and the lower casing portion is formed of synthetic resin, and in the inside of the upper casing portion or the lower casing portion made of the synthetic resin, a conduit continually extending from one end to the other end in the longitudinal direction of the hollow casing is integrally formed with the upper casing portion or the lower casing portion, and a part of a conduit wall of the conduit serves as a part of the inner wall of the upper casing portion or the lower casing portion, and an air flow path in the inside of the conduit communicates with the air outlet of respective electrode units.

2. An ionizer according to claim 1, wherein the upper casing portion is formed out of a synthetic resin, and the conduit is formed with the upper casing portion.

3. An ionizer according to claim 2, wherein the conduit is formed on an upper end portion of the upper casing portion by an external wall of the upper casing and a conduit wall extending along with the external wall, thereby the conduit and the air flow path are formed so as to be flat along the external wall of the upper casing portion.

4. An ionizer according to claim 1, wherein the lower casing portion is formed out of a synthetic resin, and the conduit is formed with the lower casing portion.

5. An ionizer according to any one of claims 1 to 4, wherein an air supply port that directly communicates with the air flow path in the resin casing is opened in an end plate that closes an end portion of the hollow casing.

6. An ionizer according to any one of claims 1 to 4, wherein the electrode units include a pair of first and second needle electrodes that are arranged to oppose each other and to which positive and negative high voltages are individually applied, and the control unit is structured to perform a control to switch between (1) a first electrified condition to apply the positive high voltage to the first needle electrode and connect the second needle electrode to ground at the same time and (2) a second electrified condition to connect the first needle electrode to ground and apply the negative high voltage to the second needle electrode at the same time.

* * * * *